United States Patent [19]

Hufnagel

[11] Patent Number: 4,550,973
[45] Date of Patent: Nov. 5, 1985

[54] ACHROMATIC HOLOGRAPHIC OPTICAL SYSTEM

[75] Inventor: Robert E. Hufnagel, Ridgefield, Conn.

[73] Assignee: The Perkin-Elmer Corporation, Norwalk, Conn.

[21] Appl. No.: 475,285

[22] Filed: Mar. 14, 1983

[51] Int. Cl.$^4$ ................................................. G02B 5/32
[52] U.S. Cl. ..................................... 350/3.72; 350/3.7
[58] Field of Search ....................... 350/3.7, 3.72, 3.73

[56] References Cited

PUBLICATIONS

Madjidi-Zolbanine et al., "Holographic Correction ...", Applied Optics, vol. 18, No. 14, 15 Jul. 1979, pp. 2385–2393.

Jacobs, Fundamentals of Optical Engineering, 1943, McGraw-Hill, pp. 137 to 138.

Sweatt, "Achromatic Triplet Using Holographic Optical Elements", Applied Optics, vol. 16, No. 5, May 1973, pp. 1390–1391.

Primary Examiner—John K. Corbin
Assistant Examiner—William Propp
Attorney, Agent, or Firm—Thomas P. Murphy; Edwin T. Grimes; Francis L. Masselle

[57] ABSTRACT

An achromatic imaging system employs a diffractive hologram as the primary element. A conventional achromatic optical element, comprising either a refractive lens or mirror, is positioned between the primary element and a second holographic optical element. The holographic and conventional elements combine to form an imaging system characterized by high resolution and light weight.

20 Claims, 5 Drawing Figures

ACHROMATIC HOLOGRAPHIC OPTICAL SYSTEM

BACKGROUND OF THE INVENTION (1) Field of the Invention

The present invention relates to optical systems and particularly to an achromatic holographic imaging system. More specifically, this invention is directed to color correction in optical systems using diffractive elements. Accordingly, the general objects of the present invention are to provide novel and improved apparatus and methods of such character.

(2) Description of the Prior Art

Optical systems, for example telescopes, which incorporate conventional optical elements, such as mirrors and lenses, are well known in the art. Such systems are relatively large and heavy. It has been suggested, in the interest of reducing weight, to fabricate optical systems using diffractive optical elements such as holographic elements and/or zone plates.

When designing an optical systems to have high resolution it is essential that the primary element have a large aperture. In order to have this large aperture use conventional elements, the primary element must itself be relatively large. This requisite large size of the primary optical element hinders the design of some optical systems, telescopes for use in space for example, due to the difficulties of manufacturing and subsequent transporting large mirrors and lenses.

It has been determined that holographic optical elements, which possess the same aperture size as conventional optical elements, can be fabricated. Such holographic optical elements will be considerably smaller in size and weigh less than a conventional lens having comparable optical characteristics. This has led to the suggestion of fabricating holographic optical systems incorporating only holographic elements. For a discussion of such holographic systems, reference may be had to Sweatt, "Achromatic triplet using holographic optical elements" which appeared in Applied Optics, Vol. 16, No. 5, May 1977, pages 1390 and 1391. However, an optical system using only holographic elements would have the distinct disadvantage of being useful only over a small spectral band, i.e., the system would lack color correction. This lack of color correction would greatly limit the overall usefulness of a holographic system. The limitation to a small spectral band is due to the low and high order chromatic aberrations inherent in thin-lens equivalent holographic elements, i.e., holographic elements are more dispersive than conventional glass lenses.

SUMMARY OF THE INVENTION

The present invention overcomes the above-discussed disadvantages and other deficiencies of prior art optical systems by providing an archromatic optical system incorporating both holographic and conventional optical elements.

In accordance with the present invention an optical system is presented wherein a conventional achromatic optical element is positioned between two holographic elements, one of these holographic elements being the primary element of the system. The conventional optical element may either be an achromatic field lens or an achromatic mirror.

The relationship between the power and the focal length of each optical element and the distance between them is such that the system has no color, either lateral or longitudinal, for paraxial rays.

Furthermore, since the primary element is holographic it has a larger aperture when compared with a conventional optical element of the same size and thus optical systems of high resolution can be made lighter in weight than heretofore possible.

BRIEF DESCRIPTION OF THE DRAWING

The present invention may be better understood and its numerous objects will become apparent to those skilled in the art by reference to the accompanying drawing wherein like reference numerals refer to like elements in the several FIGURES and in which.

DESCRIPTION OF THE PREFERRED EMBODIMENTS

The present invention is directed to an optical systems which combine in a unique manner, a conventional optical element with holographic elements to provide an achromatic system which has a large aperture. The conventional optical element is achromatic and is positioned between the two holographic elements, one of the holographic elements serving as the primary element for the system.

Figure 1:
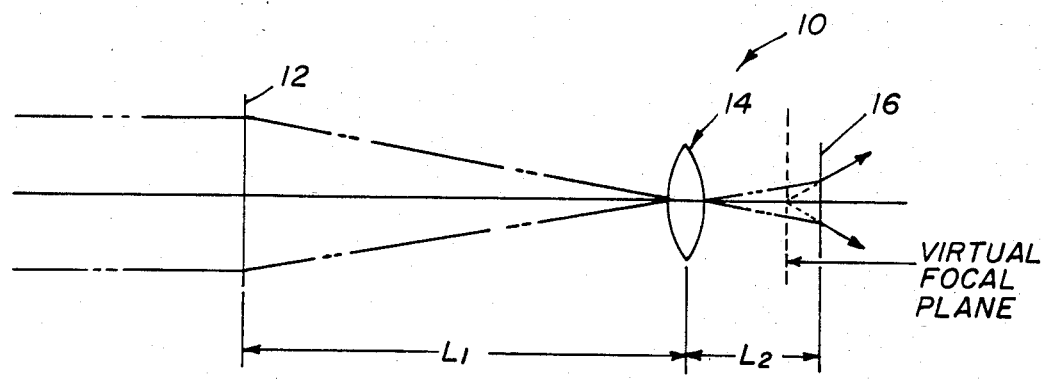
FIG. 1 is a schematic diagram depicting a first embodiment of the present invention, the FIG. 1 embodiment having a virtual focus.

In describing a system according to one embodiment, as indicated generally at 10 in FIG. 1, the paraxial ray approximation will be used and the overall system will be analyzed according to the ray matrix method. System 10 may be represented by the following matrix M:

$$M = \begin{bmatrix} A & B \\ C & D \end{bmatrix} = \begin{bmatrix} 1 & 0 \\ -\phi_3 & 1 \end{bmatrix} \begin{bmatrix} 1 & L_2 \\ 0 & 1 \end{bmatrix} \begin{bmatrix} 1 & 0 \\ -\phi_2 & 1 \end{bmatrix} \begin{bmatrix} 1 & L_1 \\ 0 & 1 \end{bmatrix} \begin{bmatrix} 1 & 0 \\ -\phi_1 & 1 \end{bmatrix}$$

where
$\phi_1$ = the power of primary holographic element 12;
$\phi_2$ = the power of achromatic lens 14; and
$\phi_3$ = the power of holograhpic element 16.

Primary holographic element 12 has a focal length f equal to $1/\phi_1$, while $f = 1/\phi_2$ for achromatic lens 14 and $f = 1/\phi_3$ for holographic element 16. $L_1$ and $L_2$ represent the respective distances between primary holographic element 12 and lens 14 and holographic element 16.

The powers $\phi_1$ and $\phi_3$ for the holographic elements 12 and 16, respectively, are linear in wavelength. In order to optimize system 10 for a given wavelength $\lambda'$, and to provide powers $\phi_1'$, $\phi_2'$ and $\phi_3'$ which are independent of a given wavelength, then the power $\phi_1$ of element 12 must be equal to $\phi_1'$ ($\lambda/\lambda'$), while power $\phi_3$ of element 16 should equal $O_3'$ $(\lambda/\lambda')$. The power $\phi_2$ of element 14 is $\phi_2'$ since it is achromatic and thus normally independent of wavelength.

With this in mind the equations for the various elements of matrix M are:

$A =$ a constant $$K = (L_1 L_2 \phi_2' - L_1 - L_2)\phi_1'(\lambda/\lambda') + (1 - L_2\phi_2') \quad (1)$$

$$B = (-L_1 L_2 \phi_2' + L_1 + L_2) \quad (2)$$

$$C = -(L_1 L_2 \phi_2' - L_1 - L_2)\phi_1'\phi_3'(\lambda/\lambda')^2 + (L_2\phi_2'\phi_3' + L_1\phi_1'\phi_2' - \phi_1' - \phi_3')(\lambda/\lambda') - \phi_2' \quad (3)$$

$$D = -(-L_1 L_2 \phi_2' + L_1 + L_2)\phi_3'(\lambda/\lambda') + (L_1\phi_2 + 1) \quad (4)$$

If $(-L_1 L_2 \phi_2' + L_1 + L_2)$ and $(L_2\phi_2'\phi_3' + L_1\phi_1'\phi_2' - \phi_1' - \phi_3')$ are both made equal to zero, system 10 will have no color, either lateral or longitudinal, for paraxial rays. Equation (1) represents the imaging condition $$\frac{1}{f_2} = \frac{1}{L_1} + \frac{1}{L_2}$$

where the power $\phi_2$ of lens element 14 is such that it images hologram element 12 upon hologram element 16. The term $\phi_2$ can thus be removed from the equation (2) to obtain:

$$\frac{\phi_1}{\phi_3} = -\left(\frac{L_2}{L_1}\right)^2 \quad (5)$$

Thus, if the variable parameters, i.e., power, focal length, and distance, of elements 12, 14 and 16 meet the conditions of the following equations for a given wavelength $\lambda$ system 10 will be achromatic:

$$(6) \frac{1}{f_2} = \frac{1}{L_1} + \frac{1}{L_2} \; ; \text{ and } (7) \frac{\phi_1}{\phi_3} = -\left(\frac{L_2}{L_1}\right)^2.$$

The only limitation present with a system satisfying the above parameters is induced high order chromatic aberrations and vignetting when the wavelength varies about the design optimum. In order to compensate for this limitation the relative aperture of the lens 14 must remain greater than $\Delta\lambda/\lambda$. Thus the spectral range increased proportionally to the increase of the aperture of lens element 14 with respect to the aperture of holographic element 12.

The only remaining limitations of system 10 which satisfy the above discussed requirements are high order aberrations including non-paraxial chromatic aberrations.

A system according to another embodiment of the present invention will have the same requirements and conditions as discussed above for system 10 of FIG. 1 with the exception that achromatic lens element 14 is replaced by an achromatic mirror element.

The holographic elements 12 and 16 may either be a flat reflective or transmission holographical element or be a curved reflective holographic optical element. The second holographic optical element will usually be curved, i.e., concave to the left as the system is shown in FIG. 1. Furthermore, each holographic element 12 and 16 may in practice be a double holographic element; i.e., two holographic elements which meet the parameters stated above. This use of two elements allows for the correction of higher order aberrations and/or higher net optical transmission.

The holographic elements used in the practice of the present invention may utilize transmission or reflective forms of diffraction.

The holographic elements may also be blazed, i.e., have faceted surfaces whose angles are arranged to favor the diffraction of light into one particular preferred direction.

The holographic elements may be thick, compared to the wavelength of light, with an internal structure arranged so as to favor the diffraction of light in one particular direction. However, when the thickness of a hologram exceeds the length of a wave of light, it can no longer be treated by the simple transmittance equations of a thin hologram. Instead, the hologram must be described by a different set of conditions. In particular, light scattered from the various depths of the hologram must constructively interfere to form an image. This process of phase matching effectively suppresses the light scattered into all but one order. Proper choice of hologram geometry can make the enhanced order the order of interest and can provide a high diffraction efficiency.

The optical system shown in FIG. 1 has a virtual focus. In most applications of practical interest, the system is designed with a real focus. The system shown in FIG. 1 may be converted to one with a real focal plane by the addition of a second conventional, reflective or refractive optical element 18 following the second diffractive holographic optical element 16. An embodiment with a real focal plane is illustrated in FIG. 2.

Figure 2:
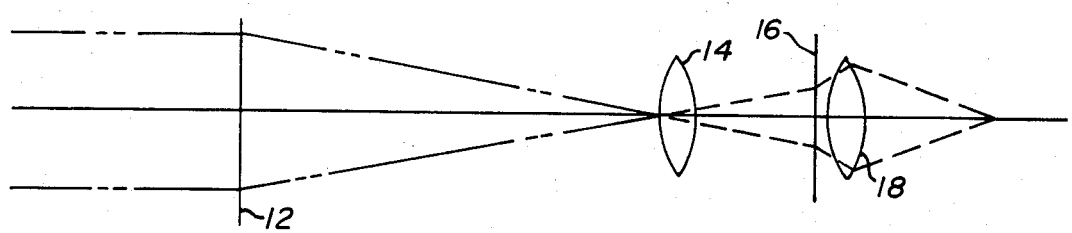
FIG. 2 is a schematic diagram of a modification of the embodiment of FIG. 1 wherein the system has a real focal plane.

In a variant of the FIG. 2 embodiment, the second diffractive element and the second conventional element can be combined into one element which has the diffractive structure imposed on the surface of the conventional element.

Although the conventional optical elements have been shown in the embodiments of FIGS. 1 and 2 as comprising single refractive elements, those skilled in the art will recognize that groups of reflective and/or refractive elements arranged to accomplish essentially similar functions may be substituted for a single element. By using such groups of conventional elements, correction for higher order aberrations may be achieved.

The optical systems shown in FIGS. 1 and 2 are symmetrical about a central axis. In the alternate configuration of FIG. 3, the system can be non-symmetric so as to enhance the rejection of stray light.

Figure 3:
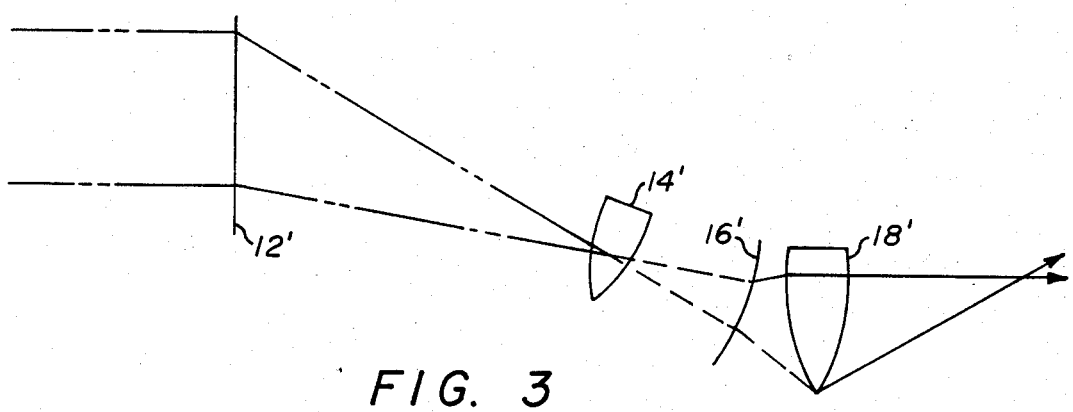
FIG. 3 is a schematic diagram of another embodiment of the invention.

In FIG. 3 holographic element 16' is disposed off-axis as are refractive elements 14' and 18' such that they are non-symmetric relative to the optical axis. Refractive elements 14' and 18' are similar to refractive elements 14 and 18 of FIG. 2 except that each is halved. The optical system of FIG. 3 functions the same as that of FIG. 2 except stray light is rejected due to the off-axis orientation of the elements 16', 14' and 18'.

Figure 4:
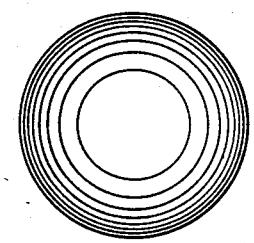
FIG. 4 depicts the diffractive structure of a holographic element for use in the present invention.
Figure 5:
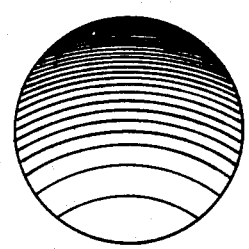
FIG. 5 depicts the diffractive structure of an asymmetric holographic element for use in the present invention.

For axially symmetric systems, the diffractive structure of the holographic elements will appear as many concentric circles arranged essentially in a form known as a "zone plate". In this form, the spacing between two adjacent circles is inversely proportional to the mean diameter of the two circles. FIG. 4 illustrates such a form (with fewer than normal circles shown). FIG. 5 shows a corresponding asymmetric element for use in non-symmetric systems, such as shown in FIG. 3. Small variations in spacing allow for the correction of higher order aberrations.

It is to be understood that the invention is not limited to the embodiments described and shown herein, which are deemed to be illustrative of the best mode of carrying out the invention, and which are susceptible to modification of form, size, arrangement of parts and details of operation. The invention rather is intended to encompass all such modifications which are within its spirit and scope as defined by the claims.

What is claimed is:

1. An optical imaging system achromatic over a wide band comprising:
    a first diffractive optical element, said first element comprising a hologram, said first element comprising the system primary element, said first element having a comparatively large aperture and a focal length $1/\phi_1$;
    an optical axis defined by a line bisecting and perpendicular to said first diffractive optical element;
    a second diffractive optical element, said second element comprising a hologram, said second element being spacially displaced from said first element; and
    a third optical element positioned intermediate said first and second elements in the direction of travel of light, said third element being achromatic.

2. The apparatus of claim 1 wherein said third optical element is refractive.

3. The apparatus of claim 1 wherein said first optical element functions as a lens and said third element is spaced from said first element by said focal length $1/\phi_1$.

4. The apparatus of claim 3 wherein said third element is a refractive lens having a focal length $1/\phi_2$.

5. The apparatus of claim 1 wherein said system is symmetric about said optical axis.

6. The apparatus of claim 1 wherein said system is non-symmetric with respect to said optical axis.

7. The appartus of claim 1 further comprising:
    a fourth optical element, said fourth element receiving an image from said second element and focusing said image at a focal plane.

8. The apparatus of claim 7 wherein said system is symmetrical about said optical axis.

9. The apparatus of claim 8 wherein said third and fourth elements are refractive lenses.

10. The apparatus of claim 7 wherein said system is non-symmetric relative to said optical axis.

11. The apparatus of claim 9 wherein said first and second elements are thin-lens equivalent holographic elements comprising zone plates.

12. The apparatus of claim 1 wherein said first and second optical elements are thin-lens equivalent holographic elements.

13. The apparatus of claim 12 wherein said third optical element is a refractive lens having a focal length $1/\phi_2$, said third element being spaced from said first element by a distance equal to $1/\phi_1$, and wherein said second element is spaced from said third element by a distance equal to $1/\phi_2$.

14. The appartus of claim 13 further comprising:
    a fourth optical element, said fourth element receiving an image from said second element and focusing said image at a focal plane.

15. The apparatus of claim 14 wherein said fourth element is a refractive lens.

16. The apparatus of claim 15 wherein said system is non-symmetric relative to said optical axis.

17. The apparatus of claim 14 wherein said system is non-symmetric relative to said optical axis.

18. The apparatus of claim 16 wherein said holographic elements comprise zone plates.

19. The apparatus of claim 1 wherein the power and focal length of the optical elements are selected such that the system has no color for paraxial rays.

20. The apparatus of claim 19 wherein the following equations are satisfied:

$$\frac{1}{f_3} = \frac{1}{L_1} + \frac{1}{L_2} \; ; \text{ and } \frac{\phi_1}{\phi_2} = -\left(\frac{L_2}{L_1}\right)^2.$$

wherein $f_3$ is the focal length of the third element, $L_1$ is the distance between the first and third elements, $L_2$ is the distance between the second and third elements and $\phi_1$ and $\phi_2$ are respectively the powers of the first and second elements.

* * * * *